United States Patent Office 2,938,334
Patented May 31, 1960

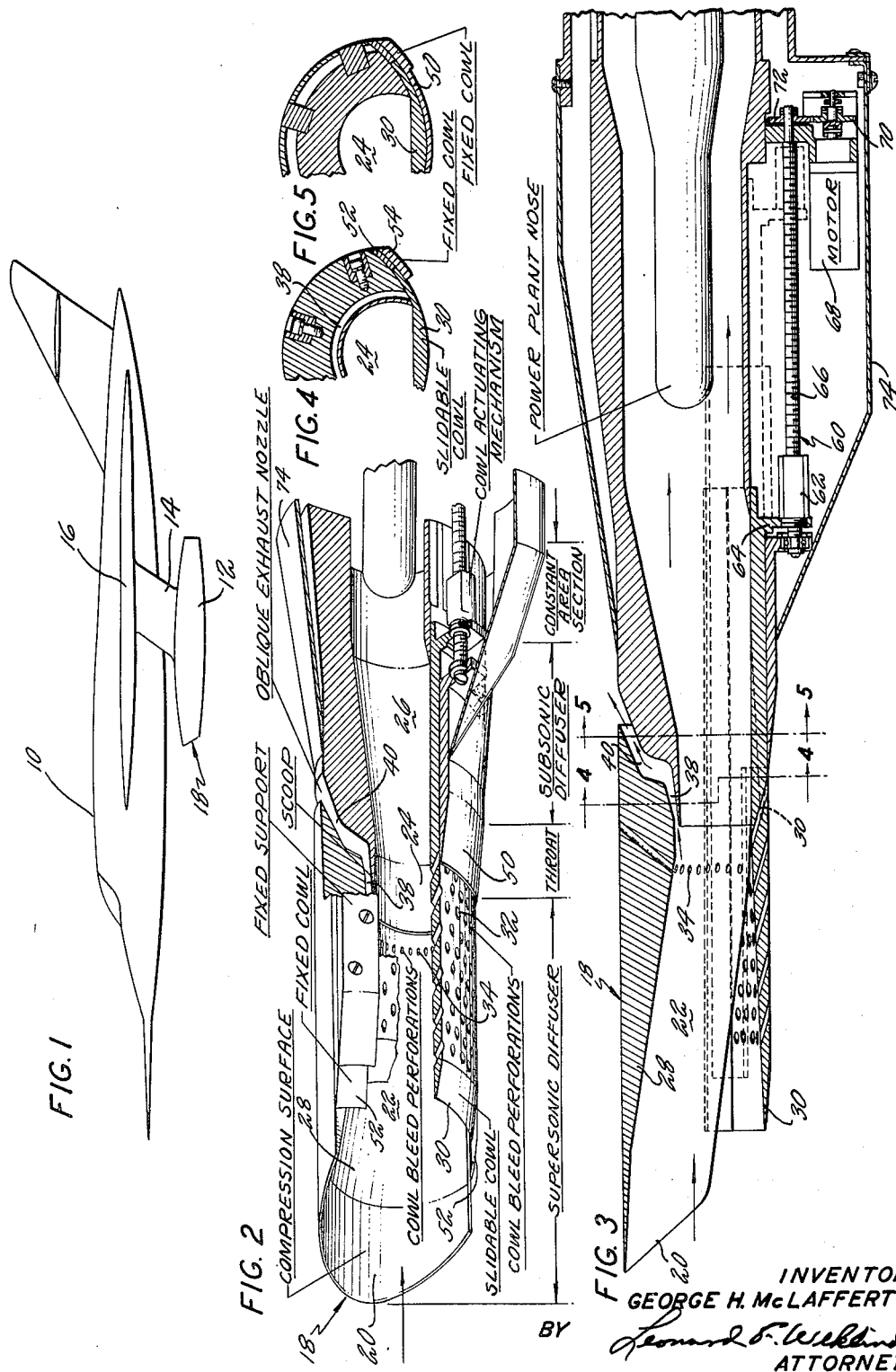

2,938,334

SUPERSONIC INLET

George H. McLafferty, Manchester, Conn., assignor to United Aircraft Corporation, East Hartford, Conn., a corporation of Delaware Filed Dec. 23, 1957, Ser. No. 704,673

8 Claims. (Cl. 60—35.6)

This invention relates to air inlets and more particularly to inlets subject to high supersonic velocities.

In my patent application Serial No. 528,643, filed August 16, 1955, for Supersonic Scoop Inlet, I describe an inlet which has three compression surfaces. However, in that application the compression surfaces within the inlet are substantially flat and therefore form corners where the surfaces intersect. These corners do not lend to highly efficient compression and pressure recovery due to the losses obtained at these corners. In addition, the flat sides result in heavier structural weight than an inlet with curved sides.

It is therefore an object of this invention to provide a supersonic inlet which avoids these corners and flat sides in part at least.

It is a further object of this invention to provide an inlet which has a slidable cowl forming one wall and a stationary member forming a second fixed wall. These walls are formed circular in cross section, but the arcs formed by these walls have different radii and have centers which are spaced apart.

These and other objects of this invention will become readily apparent from the following detailed description of the drawing in which:

Fig. 1 is a schematic illustration of a high speed aircraft having an inlet of this invention;

Fig. 2 is a perspective illustration in partial cross section of a typical model of the inlet of this invention with the inlet rotated approximately 60° from its normal position;

Fig. 3 is an enlarged cross-sectional illustration of a model of the inlet;

Figs. 4 and 5 are cross-sectional illustrations taken along the lines 4—4 and 5—5, respectively, of Fig. 3.

Sketches of a full-scale inlet would look substantially the same as the sketches of the model of the inlet shown in Figs. 2 through 5. However, certain refinements in design could obviously be incorporated in the full-scale inlet which are not shown herein for convenience. Fig. 1 shows a high speed aircraft 10 having a power plant pod 12 mounted on a strut 14 to the wing 16. The pod 12 includes an inlet 18 according to this invention. It is also possible to mount said inlet on the nose of an aircraft body or from other parts of the aircraft. The inlet 18 is also illustrated in Figs. 2 and 3 and includes an upstream opening 20 which passes air to a supersonic diffuser portion 22. Air passes from the supersonic diffuser to a throat portion 24 and to a subsonic diffuser 26. The inlet 18 is formed by a compression surface 28 which has an arcuate inner surface forming a substantially major portion of the inlet wall. The remaining wall portion of the inlet is formed by a slidable cowl 30 which is movable along the longitudinal axis of the inlet. The retracted position of the cowl 30 is shown by dotted lines in Fig. 3. The slidable cowl may include a plurality of boundary layer bleed passages 32 throughout a majority of its surface. On the other hand, the fixed cowl may carry a lesser number of bleed passages 34 at a point near the throat 24. A major portion of the boundary layer air which builds up along the surfaces of the compression surface 28 is bled off by means of a scoop 38 and then conducted to some suitable exhaust area by means of a passage 40. The movable cowl 30 is supported by a fixed cowl 50 which at its aft end completely surrounds the slidable cowl 30. However, fixed cowl 50 has forwardly extending, laterally spaced elements 52 and 54 which engage the lateral ends of the slidable cowl member 30. If pictured in plan form from underneath, this fixed cowl would have a U-shape. It will be noted in Figs. 4 and 5 that the fixed cowl 50 surrounds the bottom of the movable cowl only near and downstream of the station marked by line 5—5 in Fig. 3. Upstream of this point the forwardly extending lateral element 54 merely supports the sides of the slidable cowl 30 (Fig. 4).

The slidable cowl may be actuated by a jack screw mechanism generally indicated at 60 in Fig. 3. The nut 62 is attached to a flange 64 fixed to the slidable cowl element 30 so that upon rotation of the screw 66 the nut 62 will be moved along the axis of the screw 66. A suitable motor 68 may drive a gear 70 which in turn drives a gear 72 which is fixed for rotation with the drive screw 66.

The method of cowl actuation was chosen for convenience of model fabrication and, for the model, the entire cowl-actuating mechanism would be hidden under a windshield 74. The cowl-actuating mechanism in a full-scale inlet would be of small enough size so as not to protrude outside the basic contour of the inlet.

The arcuate surfaces formed by both the fixed inlet surface 28 and the surface generated by the slidable cowl 30 are formed about different centers. Thus, the inlet is not necessarily perfectly circular.

This inlet has particular advantages over conventional cowls which have central bodies therein, i.e., movable plugs. There is herein provided a high pressure recovery at angle of attack due to the lack of a central body and due to the sweepback of the slidable cowl and the fixed compression wall.

With this type of cowl, very high Mach number airstreams can be inducted without necessarily having to use an excessively heavy construction. In other words, the slidable cowl member is curved in shape and is well supported in all of its positions while still being movable in an axial direction to accommodate different free-stream Mach numbers. It is therefore apparent that as a result of this invention, a highly efficient, strong, and lightweight inlet has been provided.

Although only one embodiment of this invention has been illustrated and described herein, it will become apparent that various changes and modifications may be made in the construction and arrangement of the various parts without departing from the scope of this novel concept.

What it is desired by Letters Patent is:

1. An air inlet for a high speed aircraft having a longitudinal axis, said inlet including a first wall forming one part of said inlet and converging in a downstream direction relative to said axis to form a main compression surface, a second wall forming a second part of said inlet and being substantially parallel with said axis, said first and second walls forming an inlet passage, the downstream end of said converging wall forming a restricted throat with said second wall, means for moving said second wall along said axis to vary the geometry of the upstream opening of said inlet, a fixed sleeve surrounding said second wall portion and having its upstream lip located a substantial distance downstream of the upstream lip of said first wall, a plurality of bleed passages in said second wall for bleeding air from within said inlet passage outboard thereof, said bleed passages being dispersed over a majority of the surface of said second wall, further bleed means in said first wall adjacent said throat, and a scoop protruding from said first wall adjacent said throat for removing boundary layer flow which builds up along the upstream portion of said first wall.

2. An air inlet for a high speed aircraft having a longitudinal axis, said inlet including a first wall forming one part of said inlet and converging in a downstream direction relative to said axis, a second wall forming a second part of said inlet and being substantially parallel with said axis, said first and second walls being formed as arcs in cross section with the centers of the arcs being displaced, the downstream end of said converging wall forming a throat with said second wall, means for moving said second wall along said axis to vary the geometry of the upstream opening of said inlet, a plurality of bleed passages in said second wall for bleeding air from within said inlet passage outboard thereof, further bleed means in said first wall adjacent said throat, a third fixed wall forming a cover sleeve for said second wall in its most aft position and including a portion continuously covering the lateral edges of said second wall.

3. An air inlet for a high speed aircraft having a longitudinal axis, said inlet including a first wall forming one part of said inlet and converging in a downstream direction relative to said axis, a second wall forming a second part of said inlet and being substantially parallel with said axis, said walls in cross section being formed like arcs of a circle with the centers of the arc of each of said walls being spaced apart, said first and second walls forming an inlet passage, the downstream end of said converging wall forming a passage throat with said second wall, means for moving said second wall along said axis to vary the geometry of the upstream opening of said inlet, a plurality of bleed passages in said second wall for bleeding air from within said inlet passage outboard thereof, said bleed passages being dispersed over a majority of the surface of said second wall, further bleed means in said first wall adjacent said throat, a third fixed wall forming a cover sleeve for said second wall in its most aft position.

4. An air inlet for a high speed aircraft having a longitudinal axis, said inlet including a first wall forming one part of said inlet and converging in a downstream direction relative to said axis, a second wall forming a second part of said inlet and being substantially parallel with said axis, said first and second walls forming an inlet passage, the downstream end of said converging wall forming a throat with said second wall, means for moving said second wall along said axis to vary the geometry of the upstream opening of said inlet, a plurality of bleed passages in said second wall for bleeding air from within said inlet passage outboard thereof, said bleed passages being dispersed over a majority of the surface of said second wall, further bleed means in said first wall adjacent said throat, a third fixed wall forming a cover sleeve for said second wall in its most aft position, and actuating means carried within said third wall for energizing said means for moving said second wall.

5. An air inlet for a high speed aircraft having a longitudinal axis, said inlet including a first wall forming one side of said inlet and converging in a downstream direction relative to said axis, a second wall forming a second complementary side of said inlet and being substantially parallel with said axis, said first and second walls being formed as arcs in cross section with the centers of the arcs being displaced in a direction transversely of said axis, the downstream end of said converging wall forming a throat with said second wall, and means for moving said second wall along said axis to vary the geometry of the upstream opening of said inlet.

6. An air inlet for a high speed aircraft having a longitudinal axis, said inlet including a first wall forming one side of said inlet and converging in a downstream direction relative to said axis to form a main compression surface, the upstream end of said first wall forming a leading edge, a second wall forming a second complementary side of said inlet and being substantially parallel with said axis, said first and second walls forming an inlet passage, the downstream end of said converging wall forming a restricted throat with said second wall, the upstream leading edge of said second wall forming a lip; means for moving said second wall along said axis to vary the geometry of the upstream opening of said inlet, said second wall being movable to a maximum forward position whereby said upstream lip is substantially aft of the leading edge of said first wall, a plurality of bleed passages in said second wall for bleeding air from within said inlet passage outboard thereof, and further bleed means in said first wall.

7. An air inlet for a high speed aircraft having a longitudinal axis, said inlet including a first wall forming one side of said inlet and converging in a downstream direction relative to said axis, a second wall forming a second opposite complementary side of said inlet and being substantially parallel with said axis, said first and second walls being curved in transverse cross section and alone forming an inlet passage, the radius of curvature of said walls being different, means for moving said second wall along said axis to vary the geometry of the upstream opening of said inlet, and a plurality of bleed passages in said second wall for bleeding air from within said inlet passage outboard thereof, said bleed passages being dispersed over a majority of the surface of said second wall.

8. An air inlet for a high speed aircraft including a first wall being curved in transverse cross section forming one side of said inlet, a second wall also curved in transverse cross section and forming a second complementary side of said inlet, said second wall being straight along its longitudinal axis, said walls forming opposed concave surfaces in transverse cross section, said first and second walls alone forming an inlet passage having a longitudinal axis, the centers of curvature of said walls being spaced apart, one of said walls converging toward the other, means for moving one of said walls along said axis to vary the geometry of said inlet, and a plurality of bleed passages in one of said walls for bleeding air from within said inlet passage outboard thereof.

References Cited in the file of this patent

UNITED STATES PATENTS

| 2,632,295 | Price | Mar. 24, 1953 |
| 2,657,575 | Allen | Nov. 3, 1953 |
| 2,861,419 | Hausmann | Nov. 25, 1958 |
| 2,864,236 | Toure et al. | Dec. 16, 1958 |

FOREIGN PATENTS

| 50,033 | France | Aug. 1, 1939 |
| (3rd add'n of 779,655) | | |
| 747,705 | Great Britain | Apr. 11, 1956 |